Aug. 7, 1951  G. SNYDER  2,563,287
REAR VIEW MIRROR FOR MOTOR VEHICLES
Filed March 26, 1949
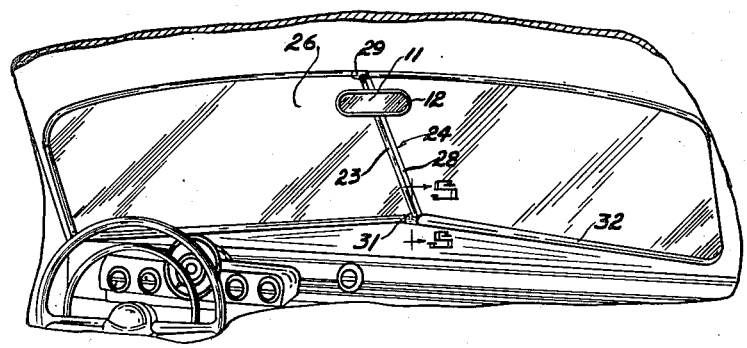
Fig. 1.
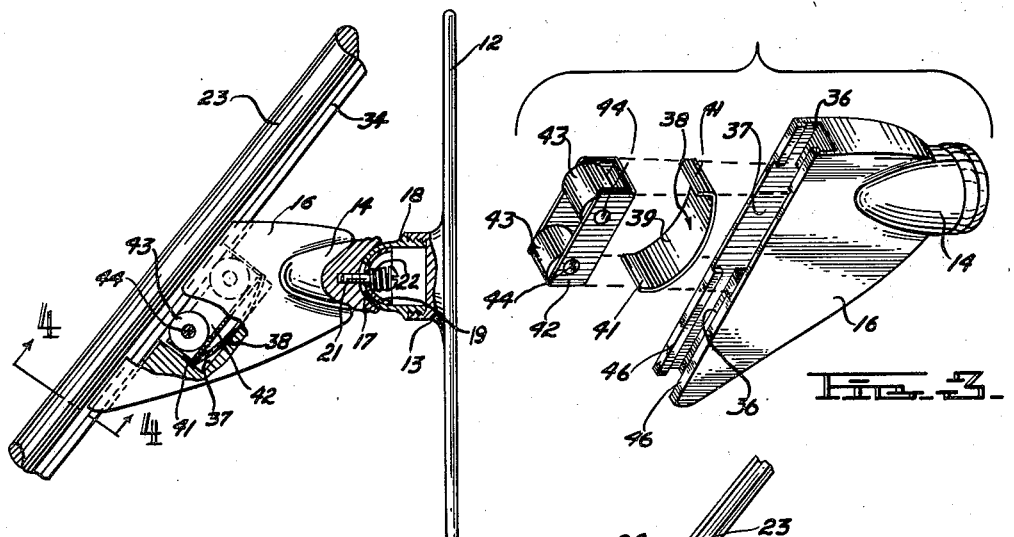
Fig. 2.  Fig. 3.
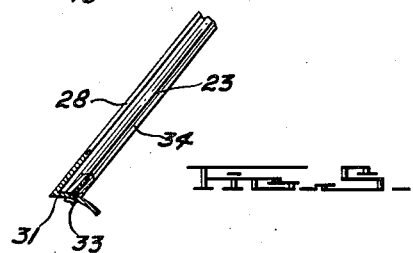
Fig. 5.
Fig. 4.
GEORGE SNYDER
INVENTOR.
BY E. C. McRae
J. R. Faulkner
T. H. Oster
ATTORNEYS Patented Aug. 7, 1951

2,563,287

UNITED STATES PATENT OFFICE 2,563,287

REARVIEW MIRROR FOR MOTOR VEHICLES

George Snyder, Detroit, Mich., assignor to Ford Motor Company, Dearborn, Mich., a corporation of Delaware Application March 26, 1949, Serial No. 83,642

4 Claims. (Cl. 248—205)

This invention relates generally to rear view mirrors for motor vehicles, and has particular reference to a rear view mirror mounted for vertical adjustment.

Heretofore, rear view mirrors for motor vehicles have generally been supported upon a bracket fixedly mounted to the vehicle roof just above the center portion of the windshield, and in a few instances have been supported upon a bracket fixedly mounted to the instrument panel adjacent the lower central portion of the windshield. While such mirrors are mounted upon their supporting brackets for swiveling adjustment, in many instances it would be extremely desirable to be also able to adjust the entire mirror vertically. It is accordingly an object of the present invention to provide a rear view mirror construction permitting bodily adjustment in a vertical direction.

In applicant's construction the mirror itself is mounted in a frame which is supported upon a bracket by means of a universal connection permitting swiveling movement of the mirror relative to the bracket, and the bracket is mounted for vertical sliding movement along a generally vertical extending support. In a car having a two piece windshield, the vertically extending support may be a guide rod mounted inside the windshield closely adjacent the dividing bar between the two windshield panes, or, alternatively, the dividing bar may be formed to integrally provide a guiding portion. With a one piece windshield, the guide rod may be located closely adjacent the center portion of the windshield. The mirror bracket is formed with a slot slideably engaging a T-shape flange on the guide rod, and a spring loaded friction assembly carried in a recess formed in the bracket frictionally clamps the bracket in any desired position along the length of the guide rod. The friction assembly shown includes a pair of rolls which hold the bracket in any adjusted position, but which permits vertical adjustment of the bracket simply by exerting a reasonable amount of hand pressure in the desired direction.

Other objects and advantages of the invention will be made more apparent as this description proceeds, particularly when considered in connection with the accompanying drawing, wherein:

Figure 1 is a fragmentary perspective view of a portion of the interior of a motor vehicle incorporating the rear view mirror of the present invention.

Figure 2 is an enlarged side elevational view, partly broken away and in section, of the rear view mirror shown in Figure 1.

Figure 3 is an exploded perspective view of the mirror bracket and the spring loaded roll assembly carried thereby.

Figure 4 is a cross-sectional view taken substantially on the plane indicated by the line 4—4 of Figure 2.

Figure 5 is an enlarged cross-sectional view taken substantially on the plane indicated by the line 5—5 of Figure 2, and showing the mounting of the mirror guide rod on the windshield dividing bar.

Referring now to the drawings, and particularly to Figures 1 and 2, the mirror glass 11 is mounted in a frame 12 provided with a central boss 13. The mirror and frame are universally mounted upon the rearwardly extending embossed portion 14 of a mirror bracket 16 by means of a ball and socket joint. The embossed portion 14 is provided with a semi-spherical socket 17 adapted to receive the ball-shaped end of a cap 18 which in turn is threaded into a recess formed in the boss 13 on the mirror frame. A semi-spherical washer 19, a retaining screw 21, and a spring 22 cooperate to yieldably hold the cap 18 in the socket 17, and to permit swiveling movement of the mirror.

In the embodiment of the invention shown, the mirror bracket 16 is mounted for generally vertical sliding movement upon a guide rod 23 supported immediately adjacent the inside of the dividing bar 24 of the two piece windshield 26. Referring to Figures 1 and 5, the inner portion of the dividing bar comprises a sheet metal molding strip 28 having an inwardly bent lower flange 31. The flange 31, and a separate flange 29 at the upper end of the dividing bar, are shaped to fit over and cover the joints between the two sections of the interior windshield molding 32. The opposite ends of the guide rod 23 are attached to the upper and lower flanges 29 and 31 by means of screws 33. The guide rod 23 may, of course, be mounted in any other convenient manner, or may be integrally formed with the dividing bar to eliminate the need for a separate piece.

The rearward edge of the guide rod is provided with a generally T-shaped flange 34 adapted to be slideably received within a T-shaped groove 36 formed in the forward edge of the mirror bracket 16. It will be seen from an inspection of Figure 4 that clearance is provided between the base of the slot 36 and the head of the flange 34 to permit a limited movement of the bracket 16 toward and away from the guide rod 23.

The mounting bracket 16 is provided with a relatively deep rectangularly shaped recess 37 extending inwardly into the body of the bracket 16 substantially at right angles to the forward edge thereof. It will be seen from Figures 2 and 3 that the recess 37 intersects the T-shaped groove 36 and extends deeper into the body of the bracket 16. A leaf spring 38, formed of spring steel, and having a generally arcuate base portion 3 and integral inturned end flanges 41, is seated in the bottom of recess 37. Between the end flanges 41 of the leaf spring 39 is a channel shaped bracket 42 carrying a pair of stub axles 44 upon which are journaled a pair of rolls 43.

As best seen in Figure 2, when the mirror bracket 16 is mounted upon the guide rod 23 with the T-shaped flange 34 of the guide rod and the T-shaped groove 36 of the bracket in telescopic engagement with each other, the rolls 43 carried in the bracket 42 are yieldably urged into frictional engagement with the rearward face of the T-shaped flange 34 of the guide rod by means of the leaf spring 38 which is located between the bottom flange of the U-shaped bracket 42 and the bottom of recess 37 in the mirror bracket. A clamping action results between the base of the T-shaped flange 34 of the guide rod and the inturned flanges 46 at the forward edge of the mirror bracket, and the strength of the spring 38 is sufficient to hold the bracket in its adjusted position along the length of the guide rod. When it is desired to adjust the mirror assembly vertically, it is only necessary to grasp the bracket 16 and push it in the desired direction either up or down, while at the same time exerting a slight pressure in the forward direction toward the windshield to compress the leaf spring 38 and relieve the clamping pressure between the base of the T-shaped flange 34 and the inturned flanges 46 of the bracket. With this clamping action relieved, the rolls 43 enable the bracket to be readily moved along the guide rod 23 to any desired position. When released, the leaf spring 38 again clamps the mirror bracket to the guide rod as above described.

It will be understood that the invention is not to be limited to the exact construction shown and described, but that various changes and modifications may be made without departing from the spirit and scope of the invention, as defined in the appended claims.

What is claimed is:

1. An adjustable mounting for a motor vehicle component, comprising a bracket, a guide member mounted upon said vehicle in a generally vertical position, inter-engaging means on said bracket and said guide member permitting sliding movement of said bracket along said guide member while preventing relative lateral displacement therebetween, an anti-friction member rotatably mounted within said bracket, and spring means yieldably urging said rotatable anti-friction member into engagement with said guide member to hold said bracket in any adjusted position along the length of said guide member but yieldable upon the application of sufficient pressure to permit adjustment of said bracket along said guide member.

2. The structure defined by claim 1 which is further characterized in that said inter-engaging means comprises a T-shaped flange on said guide member and a T-shaped groove in said bracket adapted to receive the flange on the guide member and to permit relative sliding movement therebetween, said groove having a depth somewhat greater than the thickness of the base portion of the T-shaped flange on the guide member to permit a limited movement of said bracket toward and away from said guide member.

3. The structure defined by claim 1 which is further characterized in that said anti-friction member holding the bracket in any adjusted position along the length of the guide member comprises a small bracket positioned within said first named bracket for limited movement toward and away from said guide member, a pair of rolls rotatably mounted upon said small bracket, and spring means positioned within said first named bracket and acting upon said small bracket to yieldably urge the latter and the rolls carried thereby toward said guide member and to hold said rolls in frictional engagement with said guide member.

4. An adjustable mounting for a motor vehicle component, comprising a guide member mounted within said motor vehicle in a generally vertical position adjacent the windshield thereof, said guide member having a groove in each of its opposed lateral sides to form a reduced neck portion spaced from the rearward face of said member by a transversely extending flange, a bracket having a T-shaped groove formed in its forward edge with the wider portion of the T-shaped groove slideably receiving the transverse flange of the guide member and the narrow portion of the T-shaped groove forming retaining flanges upon said bracket slideably received within the reduced neck portion of said guide member, a relatively deep rectangular recess formed in said bracket and opening into said T-shaped groove, an arcuate leaf spring member seated in the bottom of said recess, a U-shaped bracket within said recess with its base seated upon said leaf spring, a pair of anti-friction rolls rotatably mounted within said U-shaped bracket, said rolls frictionally engaging the transverse flange of said guide member and being yieldably held in engagement therewith by means of said leaf spring.

GEORGE SNYDER.

REFERENCES CITED

The following references are of record in the file of this patent:

UNITED STATES PATENTS

| Number | Name | Date |
| --- | --- | --- |
| 2,168,003 | Stone | Aug. 1, 1939 |